(No Model.)

A. VERHAGHEN.
MOSAIC ART GLASS.

No. 504,506. Patented Sept. 5, 1893.

Witnesses,

Inventor,
Adolph Verhaghen
By Dewey & Co.
Attys

UNITED STATES PATENT OFFICE.

ADOLPH VERHAGHEN, OF SAN FRANCISCO, CALIFORNIA.

MOSAIC ART-GLASS.

SPECIFICATION forming part of Letters Patent No. 504,506, dated September 5, 1893.

Application filed February 20, 1893. Serial No. 463,095. (No specimens.)

*To all whom it may concern:*

Be it known that I, ADOLPH VERHAGHEN, a citizen of Belgium, residing in the city and county of San Francisco, State of California, have invented an Improvement in Mosaic Art-Glass; and I hereby declare the following to be a full, clear, and exact description of the same.

My invention relates to mosaic glass, and the art of making the same.

It consists in a bed glass, a number of independent pieces of glass of desired designs, and adhering to the surface of the bed glass, and a filling composition in the interstices of the design pieces, composed of powdered glass and glue in a cohesive mass and adhering to the bed glass.

Figure 1:
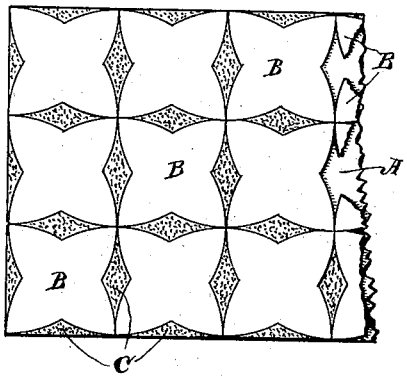
Figure 2:
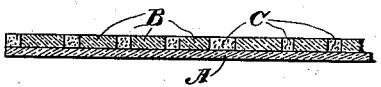

In the accompanying drawings to which reference is made for a more complete understanding of my invention,—Figure 1 is a plan of my mosaic glass, and Fig. 2 is a section of same.

A is a bed glass, consisting of any ordinary sheet of glass. Upon the surface of this, are placed the pieces B of glass of various shapes and colors, and arranged to suit any desired design. These are caused to adhere to the bed glass by glue or other adhesive material.

In the space between the pieces B, all over the exposed portions of the bed glass A, is placed a filling composition C composed of powdered glass and glue whereby it is rendered cohesive and adheres to the bed glass. This is smoothed and leveled off to be flush with the surfaces of the pieces B, so that the whole surface is smooth and level. The surface may then be dressed off and rendered permanent by a coating of varnish.

Having thus described my invention, what I claim as new, and desire to secure by Letters Patent, is—

A mosaic glass consisting of a bed glass, a number of pieces of glass of desired shape, color and arrangement to form the desired design, said pieces adhering to the surface of the bed glass, and a filling, in the interstices of said pieces, composed of a cohesive mass of powdered glass and glue, adhering to the bed glass, substantially as described.

In witness whereof I have hereunto set my hand.

ADOLPH VERHAGHEN.

Witnesses:
S. H. NOURSE,
WM. F. BOOTH.